United States Patent Office 3,781,317
Patented Dec. 25, 1973

3,781,317
SILVER KETENIDE AND PREPARATION THEREOF
Derek Bryce-Smith, Highland Wood House, Mill Lane, Kidmore End, and Ernest Thomson Blues, 36 Reeds Ave., Earley, Reading, England
No Drawing. Original application Mar. 20, 1970, Ser. No. 21,529, now Patent No. 3,647,720. Divided and this application Nov. 24, 1971, Ser. No. 202,018
Int. Cl. C07f 1/10
U.S. Cl. 260—430                                 8 Claims

ABSTRACT OF THE DISCLOSURE

The invention relates to material containing a new form of silver referred to as cluster silver in which the atoms are arranged in a lattice different from the face-centred configuration of conventional silver, and in particular to silver metal, silver compounds, silver complexes and to a new compound silver ketenide, containing cluster silver, which material is characterized in possessing a magnetic susceptibility which is field dependent, such magnetic properties being developed in the cluster silver by thermal treatment or treatment with aqueous media or methanol. The invention also relates to the uses of such material, particularly its use as a catalyst in the oxidation of organic material, and its capacity to generate carbon suboxide.

---

This is a division, of application Ser. No. 21,529, filed Mar. 20, 1970, now U.S. Pat. No. 3,647,720.

This invention relates to a new form of silver, hereinafter referred to as cluster silver; and particularly relates to material consisting essentially of cluster silver which material includes silver metal, silver complexes and silver compounds; and also relates to the use of such material as catalytically active material, to methods of preparation of such material and to chemical reactions involving such material.

Recently there has been an increasing interest in metal "cluster" compounds in which the metal atoms thereof are arranged and associated with each other in a way which is different from the arrangement in conventional compounds of such metals. However cluster silver compounds have not hitherto been known.

A form of cluster silver has been discovered, in which from X-ray analysis of precursor complexes thereof it appears that at least some of the atoms thereof are arranged in monoatomic layers, compared with the face-centred cubic arrangement of conventional silver. Such silver is initially formed by methods according to the invention in the form of complexes, from which complexes silver metal or metal compounds may be produced containing cluster silver. In material containing such cluster silver it has been found that adjacent atoms of silver in any given layer are spaced from each other at a distance (e.g. 2.84 A.) which is comparable with that of conventional silver metal (2.88 A.). The distances between adjacent layers of atoms may vary depending on the presence of interlaying material. Thus in silver ketenide a new compound produced according to the invention, which has a cluster silver structure, adjacent layers of silver atoms are linked by $C_2O$ groups, the layers being about 6 A. apart. Displacement of such groups e.g. by heating or possibly treatment with water, results in such layers moving closer to each other, while the insinuation of molecules of appropriate size and configuration between adjacent layers, e.g. substantially flat molecules such as pyridine, can result in movement of such layers away from each other.

Such cluster silver when prepared in the form of complexes according to the invention has the property of developing a magnetic susceptibility which is dependent on a magnetic field in which it is placed, and when such a magnetic property has been developed it provides a ready means whereby material (e.g. silver metal, complexes or silver compounds) which contains cluster silver, may be distinguished from silver metal, silver complexes or silver compounds which are derived wholly from conventional silver. While the reason why such magnetic properties develop in cluster silver is not known with certainty, it is believed that the generation of such magnetic properties results from the generation of irregularities in the distance of adjacent mono-atomic layers of silver atoms. Furthermore the generation of such magnetic properties in cluster silver may be co-incidental with an increase in the activity of material containing cluster silver, e.g. an increase in catalytic activity, and this observed feature is consistent with the generation of areas of high energy which would be expected to develop with irregularities in lattice structure.

Accordingly the invention provides material containing cluster silver, which is characterized by a magnetic susceptibility which is field dependent.

It is to be understood that if the material is placed in such a high magnetic field that the material becomes magnetically saturated, then the phenomenon of field dependency will not be manifest. Such saturation is present in magnetic fields of the order of 10 kilogauss.

The magnetic susceptibility may be measured by any conventional and well-known method, for instance by means of a Gouy balance.

Silver-containing complexes comprising cluster silver and having the magnetic properties according to the invention, may be prepared by reacting a compound of conventional silver with an organic anhydride, the reactants being selected so that at least one of the reactants contains a

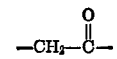

group, whereby a yellowish or yellowish-red complex is formed, which yellowish or yellowish-red complex may be distinguished from known yellow silver compounds, e.g. iodide or chromate, by a characteristic infra-red spectrum showing prominent absorption between 1900 and 2100 cm.$^{-1}$.

The properties of the complexes which contain cluster silver depend on the conditions under which they are formed, as hereinafter described. Thus their magnetic susceptibilities may be weakly field dependent, or they may be diamagnetic in character, and the field-dependent properties may be developed by subsequent treatment as hereinafter described. The complexes may be decomposed, possibly with the formation of dark-coloured intermediate products, to form silver metal containing cluster silver having magnetic properties according to the invention, or silver compounds may be formed by appropriate Ligand exchange with the said yellowish or yellowish-red complex, the said silver compounds containing cluster silver or carbon suboxide may be produced as hereinafter described. By appropriate selection of the starting materials, as hereinafter described, a complex may be produced which may be converted to a product consisting substantially of a new silver compound silver ketenide $Ag_2C_2O$, wherein the silver atoms are present in cluster form.

The particular silver compound and the particular organic anhydride used are selected so that a yellowish or yellowish-red product is formed in the reaction medium. Subject to the said test for suitability, specific classes and specific examples of silver compounds which may be used to form the said yellowish or yellowish-red complexes containing cluster silver according to the invention include the following:

Silver salts of monocarboxylic acids, e.g. formate, acetate, trimethyl acetate, trifluoroacetate, propionate, isobutyrate or lactate, or unsaturated acids e.g. acrylate; or aromatic acids, e.g. benzoate and phenylacetate.

Silver salts of polycarboxylic acids, e.g. oxalate, malonate, succinate, or adipate, or unsaturated acids, e.g. maleate or fumarate; or aromatic acids, e.g. phthalates.

Silver salts of sulphonic acids, e.g. methanesulphonate, benzenesulphonate or toluene p-sulphonate.

Miscellaneous organic salts, e.g. naphthenate and phenylacetylide.

Silver salts of inorganic acids, e.g. sulphate, nitrate, nitrite, carbonate, fluoride, perchlorate, tetrafluoroborate, hexafluorophosphate.

Miscellaneous inorganic compound, e.g. oxide, hydroxide.

Conventional silver metal may be used as a starting material in the presence of a reagent which converts the silver to a silver compound as hereinbefore described, e.g. nitric acid or peracetic acid.

Certain conventional silver compounds may not in practice produce the required yellowish or yellowish-red complex when reacted with an organic anhydride according to the invention, and their unsuitability may be recognised by their failure of the reaction medium to develop a yellow or reddish-yellow complex. Such compounds include silver halides (other than silver fluoride), silver pseudo halides and silver sulphide.

Anhydrides which may be used in the process according to the invention to produce the yellowish or yellowish-red complex according to the invention include anhydrides of monocarboxylic acids, e.g. acetic anhydride, propionic anhydride, n-butyric anhydride, n-valeric anhydride, iso-valeric anhydride, caproic anhydride, caprylic anhydride and lauric anhydride. Anhydrides of an unsaturated monocarboxylic acid may be used, e.g. acrylic anhydride. Mixed anhydrides of organic acids or organic and inorganic acids may be used, for instance acetic-isovaleric anhydride, acetic butyric anhydride, acetyl chloride, and acetyl fluoride.

In carrying out the initial reaction to form the yellow or yellowish-red complex, it is necessary that the said

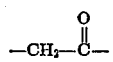

group be present in at least one of the reagents. For example the said

group may be present as the acetate group in silver acetate starting material, or may be present in the organic anhydride. Thus suitable combinations of reactants are silver acetate and benzoic anhydride or silver benzoate and acetic anhydride. Such combinations as silver benzoate and benzoic anhydride may not however be used, as such a combination does not include a

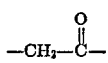

group.

In the reaction to produce the said yellow or yellowish-red silver complex, carboxylic acid(s) are formed from the starting materials. For instance with silver acetate and acetic anhydride, acetic acid is the major by-product, and as such tends to inhibit the formation of the said complex and should therefore preferably be removed during the course of the reaction, for instance by fractional distillation, or its effect minimized by the presence of a large molar excess of the anhydride component based on the silver reactant, e.g. from 20:1 to 40:1, whereby the carboxylic acid is diluted and its inhibitory effect decreased.

The reaction may be carried out under air or an inert atmosphere for example argon. Nitrogen is not an inert gas, as nitrogen may enter the product.

The reaction between the silver compound and the organic anhydride may if required, be effected at an elevated temperature between 80° C. and the boiling point of the reactants, preferably above 130° C., and particularly by refluxing the reaction medium.

An alternative procedure for effecting the reaction, which is a preferred method according to the invention, permits the reaction to be effected rapidly and with good yields at room temperature. The said preferred method comprises effecting the said reaction between the silver compound and the organic anhydride in the presence of at least one tertiary amine.

Specific examples of tertiary amines which may be used in the said preferred method include quinoline, isoquinoline, N,N-dimethyl aniline, 2,3-dimethyl quinoline, 2,6 - dimethyl quinoline, N,N - dimethyl - o - toluidine, N-methyl pyrrolidine, 2-methyl quinoline, 5-methyl quinoline, α-picoline, β-picoline, γ-picoline, pyridine, quinoline, trimethylamine, triethylamine, triisobutylamine, N-methylpiperidine, N-methylmorpholine, and diazabicyclooctane.

Certain very weak tertiary bases, for example triphenylamine, may not however exert a significant effect on the reaction rate, and the selection of suitable tertiary amines may readily be determined by experiment.

A particular advantage of using pyridine in the preferred method of the invention is that when a complex is obtained which is associated with pyridine, which if treated so as to remove the pyridine, particularly by heating preferably in the presence of acetic anhydride whereby the associated pyridine is driven off, a further product is obtained consisting essentially of a new silver compound, namely silver ketenide $Ag_2C_2O$, which compound is identifiable by X-ray analysis, and wherein the silver atoms in the said silver ketenide are arranged in monoatomic layers to form cluster silver. Furthermore the magnetic susceptibility of silver ketenide thus prepared may be field dependent. Complexes may be formed from the said silver ketenide with conventional silver salts.

A particularly preferred method of forming silver ketenide according to the invention comprises reacting silver acetate and acetic anhydride in the presence of pyridine. One variant of the said method is to suspend the silver acetate in the silver anhydride and to add pyridine drop-wise to the suspension at room temperature (20° C.) whilst stirring. By this means a yellow complex is formed, and silver ketenide is obtained therefrom by heating the complex with acetic anhydride to drive off the pyridine having a magnetic susceptibility which is strongly field dependent.

If however the silver acetate is first dissolved in the pyridine and acetic anhydride added drop-wise at room temperature to the solution, the silver ketenide obtained from the precipitate thereby obtained has a magnetic susceptibility which is only weakly field dependent.

The following examples of the invention are provided:

EXAMPLE 1

Preparation of silver ketenide from the reaction of silver acetate and acetic anhydride, in the presence of pyridine 20 grams of silver acetate was dissolved in 80 mls. of pyridine, and 200 mls. of acetic anhydride slowly added at 20° C. with stirring. On standing for 10 minutes a yellow precipitate had formed.

The yellow precipitate was filtered off and washed with acetic anhydride, and the solid thus obtained introduced into a 500 ml. flask with 150 mls. of acetic anhydride. The mixture was then slowly heated until all the pyridine was driven off and only acetic anhydride was being distilled over. The product complex was then filtered off, washed with methanol, and a slurry formed with acetone, and the slurry washed with methanol and ether being filtered after each washing.

The dried yellow product analyzed as $Ag_2C_2O$, and consisted of silver ketenide, the silver atoms of which were arranged in monoatomic sheets, as shown by X-ray analysis.

The magentic susceptibility of the silver ketenide was measured in different magnetic fields at 22° C., using a Gouy balance, and was found to be weakly field dependent. The results are shown in the accompanying Table 1.

The effect of heat on silver ketenide is to produce a product the magnetic susceptibility of which has enhanced field dependence. The effect is increased further if the heating is carried out in the presence of a gaseous olefin, e.g. ethylene or propylene.

EXAMPLE 2

Preparation from silver ketenide of product of enhanced magnetic properties according to the invention Silver ketenide as prepared in Example 1 was suspended in Nujol, and a mixture of air and propylene in a ratio of 15:1 by volume was slowly bubbled through the suspension while heating the suspension slowly to a temperature of 330° C. A black product was obtained which was washed thoroughly with hexane, filtered and dried.

The black product contained cluster silver, and the field dependence of its magnetic susceptibility was measured as in Example 1, and found to be more marked, the results are shown in the accompanying Table 1.

Silver metal containing cluster silver and having magnetic properties according to the invention may be obtained from the said black product by heating as shown in the following example. Furthermore the silver metal thus obtained may be used for the air oxidation of propylene to propylene oxide.

EXAMPLE 3

Preparation of silver metal containing cluster silver from the product of Example 2 derived from silver ketenide The block product of Example 2 was placed in a silica tube and heated to 180° C. and a mixture of air and propylene in a ratio of 15:1 by volume was passed through. Propylene oxide was detected in the effluent gases, and after ¾ hour, propylene oxide was being formed as the major organic product. The material was then removed from the tube, and was found to contain 96.6% by weight of silver metal containing cluster silver, having magnetic properties which are markedly field-dependent, as shown in the accompanying Table 1 which also shows for comparison the magnetic susceptibility of conventional silver of A.R. quality.

TABLE 1

Magnetic susceptibility $\chi_g^{22°\,C.} \times 10^6$ e.m.u.

| Field strength, kilogauss | Conventional silver metal | Silver ketenide of Example 1 | Black product of Example 2 | Silver metal containing cluster silver of Example 3 |
|---|---|---|---|---|
| 1.3 | −0.18 |  | +0.11 | +1.5 |
| 2.4 | −0.18 | −0.281 | +0.07 | +1.2 |
| 3.2 | −0.18 | −0.280 | −0.05 | +0.9 |
| 4.0 | −0.18 | −0.278 | −0.07 | +0.8 |
| 5.0 | −0.18 |  |  | +0.5 |
| 6.6 | −0.18 |  |  | +0.3 |
| 8.2 |  |  |  | +0.1 |
| 8.9 |  |  |  | +0.08 |

It is to be observed from the said table that the magnetic susceptibility of conventional silver was unaffected by field strength, but that the silver ketenide of Example 1 was weakly dependent on field strength, the black product of Example 2 obtained from the silver ketenide was more strongly dependent, and the magnetic susceptibility of the silver metal of Example 3 was markedly dependent on field strength.

EXAMPLE 4

Formation of silver ketenide from silver oxide and propionic anhydride 5.8 grms. of silver oxide, 80 mls. pyridine and 130 mls. propionic anhydride (as supplied by British Drug Houses Ltd. laboratory reagent quality), were stirred at 120° C. under argon for 90 minutes. The product suspension including a yellowish precipitate was cooled to 20° C. and filtered, washed with diethyl ether in pentane, and dried.

The crude product was treated with 10% aqueous peracetic acid at 20° C. for 40 minutes to remove unreacted silver oxide and silver metal formed as a by-product. The acid suspension was filtered and the residue washed with water and dried. The product was shown by X-ray diffraction photography to contain silver ketenide and silver ketenide/pyridine complex. The magnetic susceptibility thereof was field dependent as shown in Table 2.

Thermal decomposition of this material in a mixture of air and propylene in a ratio of 7:1 by volume at 180° C. gave a material containing cluster silver highly active as a catalyst for the air oxidation of propylene to propylene oxide.

TABLE 2

| Field strength, kilogauss | Magnetic susceptibility, $\chi_g^{20°\,C.} \times 10^6$ e.m.u. |
|---|---|
| 3 | +2.73 |
| 5 | +1.95 |
| 6.6 | +1.81 |
| 8.2 | +1.32 |

EXAMPLE 5

Preparation of silver ketenide from silver oxide and acetic anhydride 0.05 mole of silver oxide were suspended in 0.5 mole pyridine, and the suspension added to 1 mole of acetic anhydride at 20° C. under an argon atmosphere. A bright yellow gel formed within 1 minute which was then broken up by stirring, and after 30 minutes the yellow complex was filtered off and washed with pyridine. Excess pyridine from the washed residue was removed in a rotary evaporator.

The separated complex analysed as $Ag_2C_2O$/pyridine, and was diamagnetic in character (magnetic susceptibility $\chi^{20°\,C.} = -0.24 \times 10^{-6}$ e.m.u.). The pyridine was removed from the complex by heating, to yield silver ketenide $Ag_2C_2O$, the magnetic susceptibility of which was field dependent in a similar way to that of Example 1.

EXAMPLE 6

Preparation of silver metal containing cluster silver from silver malonate and acetic anhydride The procedure of Examples 1, 2 and 3 was repeated, except that silver malonate was used instead of silver acetate, in an equivalent proportion to the said silver acetate. A yellow precipitate was initially obtained similar to that of Example 1, which when treated according to the procedures of Examples 2 and 3, resulted in silver metal product containing cluster silver, and having magnetic properties similar to the silver metal obtained in Example 3.

In general the yellow or yellowish-red complex obtained by reaction between the silver compound and the organic anhydride according to the invention may be converted to silver metal containing cluster silver according to the invention in one of two ways, namely by controlled thermal decomposition, e.g. at a temperature above 100° C. (as hereinbefore described, with complexes associated with pyridine or possibly triethylamine, silver ketenide is formed as an intermediate compound); or by treatment with an aqueous medium or methanol, e.g. water or water vapour or a solution of a soluble compound, for instance acetic acid, for an extended period of time and preferably at an elevated temperature. Thus the complex may be so treated for from 20 minutes to 100 hours or more at a temperature of from 100° C. to 20° C. The higher the temperature used the shorter the treating time is necessary to effect the required conversion, which may be recognized by the development of a brown or dark colour accompanied by the development in the product of the magnetic properties according to the invention. Such magnetic properties may be developed at a stage earlier than the generation of silver metal.

The following examples illustrate these procedures.

EXAMPLE 7

Preparation of silver metal containing cluster silver, by water treatment of cluster silver complex A suspension of 0.1 mole of silver acetate in 3.0 moles of acetic anhydride was stirred for 1 hour at 138° C. An insoluble yellow precipitate was obtained and separated by filtration through a sintered glass filter. The filtered yellow complex was washed once with glacial acetic acid and then with cold distilled water until the washings were acid-free. Care was taken however not to dry the washed complex, as this was mildly explosive in the dry state.

The filtered complex was suspended in water at 90° C. for 5 hours, and a black solid was obtained being silver metal comprising cluster silver, having a magnetic susceptibility which was field dependent in the manner of Example 3.

EXAMPLE 8

Preparation of silver metal containing cluster silver, by heat-treatment of cluster silver complex A complex was prepared according to Example 7, and the complex was heated in a dispersed state to a temperature of 160° C. for 15 minutes, and a black powder was obtained similar in constitution and in magnetic properties to that obtained in Example 7.

EXAMPLE 9

Preparation of silver metal containing cluster silver using pyridine plus triethylamine in reaction mixture A 10% molar solution of silver acetate in pyridine was prepared, and 2 moles of triethylamine based on the silver acetate incorporated in the said solution. 4 moles of acetic anhydride, based on the silver acetate, were gradually added to the final solution while stirring at room temperature. A yellow precipitate was immediately obtained, which when treated as in Example 7 yielded a black residue of silver metal containing cluster silver having similar properties to that obtained in the said Example 7.

EXAMPLE 10

Preparation of silver ketenide from silver toluene p-sulphonate and acetic anhydride 10 moles of acetic anhydride were added to a solution of silver toluene p-sulphonate in pyridine at 20° C. An addition of 10 moles of triethylamine to the solution, a bright yellow precipitate of silver ketenide/pyridinate complex was obtained, and separated by filtration and washed with acetic anhydride. The precipitate was heated in acetic anhydride to remove the pyridine, and silver ketenide remained in suspension and was separated therefrom.

The complexes containing cluster silver obtained according to the present invention readily form adducts (mixed complexes). Thus with excess silver nitrate there is formed a double salt and which is highly explosive.

The following examples are provided of the formation of such adducts.

EXAMPLE 11

Preparation of explosive double complex with a silver salt 0.1 mole of silver acetate was suspended in 30 moles of acetic anhydride and stirred at reflux temperature of about 138° C. under argon for 16 hours, whereby a canary-yellow precipitate was formed and separated by filtration under argon at 20° C.

The complex thus obtained was washed consecutively with acetic acid and water for 15 minutes and dried under argon. The magnetic susceptibility of the product was field-dependent.

1 gram of the thus-treated complex was suspended in 15 moles of a saturated aqueous solution of silver nitrate, and the suspension when stirred developed a deep crimson colour within 10 minutes, which on standing for a further hour turned orange in colour. The orange precipitate was filtered off and washed successively with water, acetone, n-pentane and dried.

The dried precipitate was extremely explosive in nature, detonation occurring on impact, heating or on exposure to strong light.

To form such adducts, a precursor of the adduct component may be incorporated in the reaction mixture to form the complex containing cluster silver.

EXAMPLE 12

Formation of silver ketenide/silver cyanide adduct 200 moles acetic anhydride were added to a solution of 17 grms. of silver nitrate in 100 moles of acetonitrile. The mixture was heated at reflux under argon for 30 minutes. The reaction mixture was cooled to 20° C. and filtered, the residue being washed with acetonitrile and water and then suspended in 150 moles of 2M. ammonium hydroxide at 20° C. for 15 minutes.

The ammoniacal suspension was filtered and the residue washed with water and dried.

The crystalline product analyzed as $Ag_2C_2O.3AgCN$ and did not contain silver ketenide or silver cyanide as discrete crystalline phases. Infra-red analysis confirmed that it was not a mixture of silver ketenide and silver cyanide.

The composition of the cluster silver complexes according to the invention may be varied according to whether the reaction is carried out in the presence of light and oxygen (e.g. oxygen-containing gas or an oxygen-producing compound for example a peroxide) or in the absence of oxygen, or in the absence of light, or in the absence of both these factors. Thus treatment of conventional silver compounds with a carboxylic acid anhydride, e.g. acetic anhydride in the absence of a tertiary amine, yields a complex analyzing as $Ag_3C_3O_2$, when the reaction is carried out in the absence of oxygen and daylight. The presence of oxygen and daylight tends to lead to photo-oxidation and to the formation of materials analyzing as $Ag_3C_3O_3$ or $Ag_3C_3O_4$, or intermediate proportion of oxygen. This complex may also be formed by treating complex $Ag_3C_3O_2$ with hydrogen peroxide and acetic acid, or peracetic acid, or by exposing the isolated complex $Ag_3C_3O_2$ to oxygen and daylight. Usually an exposure over a period of hours effects such a change leading to up to three atoms of oxygen in the said ratio, and an exposure of weeks or months a complex of up to four atoms of oxygen in the said ratio. Since oxidation takes place at the surface of the solid complex, it is desirable to agitate during exposure. Similar changes may be produced with hydrogen peroxide and acetic acid, or peracetic acid.

Complexes analyzing as $Ag_3C_3O_2$ may be diamagnetic hereinafter referred to as Complex (I) or have a field dependent magnetic susceptibility hereinafter referred to as Complex (II).

Although Complex (I) is diamagnetic if isolated under anhydrous conditions, treatment with an aqueous medium such as distilled water yields Complex (II) of similar appearance and empirical formula but which is remarkable in exhibiting field-dependent magnetic susceptibility. Typically at field-strengths of 7.3, 8.2 and 9.6 kilogauss, the gram magnetic susceptibility was $\chi_g^{20°C.} \times 10^{-6}$ is 9.76, 6.12 and 4.65 e.m.u. respectively.

Complexes (I) and (II) are photo-oxidised by sunlight in the presence of oxygen to produce materials analyzing as $Ag_3C_3O_3$ designated complexes (III), and possibly to $Ag_3C_3O_4$ designated complexes (IV). Such materials have a magnetic susceptibility which is field-dependent.

Such complexes and materials resemble Complex (I) in their yellow colour, insolubility and tendency to explode when heated or struck.

The following examples are provided of the preparation of silver complexes according to the invention, the preparation of cluster silver therefrom, and the preparation of cluster silver compounds by ligand exchange, the preparation of carbon sub-oxide from such complexes, and the production of mixed complexes (e.g., silver ketenide adducts).

EXAMPLE 13

Preparation of carbon sub-oxide 1 mole of silver acetate was heated with 30 moles acetic anhydride at reflux under argon for 16 hours. The insoluble yellow product was filtered without exposing to oxygen and analyzed as $Ag_3C_3O_2$. The yield was about 90%. Some samples have contained up to 0.2% hydrogen. Exposure of two gm. of this complex to light and oxygen for 2 hours with agitation gave a complex analyzing as $Ag_3C_3O_3$. On rapid heating, the complex explosively evolved carbon sub-oxide as the major gaseous product.

The following example is provided showing the preparation of a Type I Complex as hereinbefore described and the development of a Type II Complex therefrom with magnetic properties according to the invention by treatment with water. It is to be noted that the treatment with water stops short of the development of silver metal containing cluster silver.

EXAMPLE 14

0.1 mole of silver acetate was suspended in 30 moles of acetic anhydride and stirred at reflux temperature of about 138° C. under argon for 16 hours. Small amounts of $C_3O_2$, $CH_2CO$, $CO_2$, $CO$, and $CH_4$ were evolved during the first 30 minutes of the reaction, but subsequently only traces of $CO_2$ were found. The canary-yellow insoluble product was separated by filtration under argon at 20° C. The clear yellow filtrate contained acetic acid (0.019 mole), methyl acetate (0.0007 mole), and ethyl acetate (0.00006 mole). Evaporation of the filtrate at about 60°/10 mm. yielded about 0.02 g. of a brown residue, largely silver acetate.

The yellow complex in the filter was divided into two portions. The first portion was freed from acetic anhydride in a stream of dry argon. This material was a type I complex as hereinbefore described and had a gram magnetic susceptibility $\chi_g^{20°C.}$ of $-0.26 \times 10^{-6}$ e.m.u., analyzing as $Ag_3C_3O_2$. (Found: C, 9.3; H, 0.1; Ag, 82.0. $Ag_3C_3O_2$ requires C, 8.2; Ag, 82.7%). The magnetic susceptibility of the said complex was not markedly field-dependent.

The effect of treating the complex with an aqueous medium to obtain a composition containing cluster silver according to the invention was shown by treating a second portion of the complex by washing consecutively with acetic acid and water over a period of time of 15 minutes, and drying under argon. The product material was a Type II Complex as hereinbefore described and had the same empirical formul as Complex I, within analytical error, but exhibited a magnetic susceptibility which was field-dependent.

Similar complexes were obtained using acetic anhydride and silver$^I$ formate, -benzoate, -propionate, -sulphate, -carbonate, -nitrate, -trifluoracetate, and -tetrafluoroborate. The last two salts when used were first dissolved in toluene.

EXAMPLE 15

The said diamagnetic complex of Example 14 in finely-divided form was agitated in aqueous suspension under oxygen at 20° C. exposed to light from a 250-watt tungsten-filament lamp for a total period of about 24 hours. The reaction vessel was immersed in a thermostat at 20° C. The resulting complex analyzed as $Ag_3C_3O_3$ and was a Type III Complex as hereinbefore described. (Found (percent): C, 9.1; H, 0.1; Ag, 79.2. $Ag_3C_3O_3$ requires (percent): C, 8.8; Ag, 79.4) which exhibited a magnetic susceptibility which was field-dependent (at field-strengths of 7.3, 8.2 and 9.6 kilogauss $\chi_9^{18°C.} \times 10^6 = 6.12$, 4.61 and 3.20 e.m.u. respectively).

The following example is an example of the preparation of silver metal containing cluster silver, derived from the Type (II) Complex of Example 14.

EXAMPLE 16

Reaction of Complex (II) of Example 14 with 4–N aqueous sodium chloride for 4 hours at 98° C. gave a mixture (analysing approximately as $Ag_3Cl_2$) from which silver chloride was removed by aqueous ammonia to give a black electrically-conducting material consisting essentially of cluster silver. (Found (percent): C, 1.2; Ag, 98.3) having a magnetic susceptibility which was field-dependent. The material on heating in air at about 350° C. abruptly lost carbon to give diamagnetic silver metal (Found: Ag, 99.8%), but the magnetic properties were largely unchanged after brief heating to 500° C. in argon. The magnetic susceptibility of the silver indicated that it contained the whole of the structural elements responsible for the field-dependent properties of its precursor. The results further indicated that only one-third of the silver in Complex II is responsible for its magnetic properties and that two-thirds is present as, or transformed to, silver$^I$.

The following example is provided of the preparation of cluster silver bromide by ligand exchange of the Type (II) Complex of Example 14.

EXAMPLE 17

Treatment of Complex II of Example 14 with 2.5-N potassium bromide at 98° for 4 hours gave a brown precipitate analysing approximately for $Ag_{10}Br_9$. Treatment of the precipitate with an excess of 0.880 ammonia dissolved out normal silver bromide leaving a material analysing for $Ag_4Br_3$ having a magnetic susceptibility which was field-dependent. This appeared to be a mixture of silver bromide and silver metal containing cluster silver. The cluster silver bromide was unstable in contact with 0.880 ammonia and within several hours gave ordinary diamagnetic silver bromide and a black residue, containing cluster silver (Found: Ag, 99.2%) having a magnetic susceptibility which was field-dependent.

All the complexes of Examples 15 to 17 explosively liberated carbon sub-oxide $C_3O_2$ when rapidly heated.

Cluster silver material according to the invention is an outstanding catalyst for the oxidation of organic compounds. In particular when used for reactions normally catalysed by conventional silver e.g. the air oxidation of ethylene to ethylene oxide, the reaction with silver metal containing cluster silver proceeds rapidly at a substantially lower temperature and higher selectivity. Thus ethylene is conventionally oxidised at temperatures of the order of 250° to 350° C. with a selectivity of about 50 to 60%.

Using cluster silver as a catalyst, ethylene is oxidised to ethylene oxide at a temperature of from 150° to 200° C. with a selectivity of 75% or more.

Furthermore, cluster silver material according to the invention may be used to catalyse chemical reactions which are not catalysed by conventional silver. Thus propylene may be air-oxidised to propylene oxide in the presence of silver metal containing cluster silver preferably at tempertures of 180° to 240° C. In general aromatic compounds, e.g. toluene and p- and m-xylene unsaturated compounds of the type $RCH=CH_2$ where R is H, a $C_1C_{13}$ preferably $C_1-C_3$ alkyl, group, or is a phenyl or a substituted phenyl group, e.g. styrene or alkylated styrene, or oxygenated compounds, e.g. acetic acid and alcohols, may be oxidised by the use of cluster silver material according to the invention.

It is to be emphasized that the complex precursors used in the preparation of metal containing cluster silver and not suitable for effecting catalysis of hydrocarbon oxidation in their precipitated form. Thus coloured complexes do not effect significant oxidation of ethylene and propylene at temperatures below their decomposition temperatures, e.g. 160° C.

Catalyst compositions according to the invention comprise silver metal containing cluster silver supported on a carrier material, e.g. particulate alumina and/or silica, glass particles, glass wool, kieselguhr, clays and zeolites, or other carrier material conventionally used for supporting catalysts.

Such supported catalyst compositions may conveniently be prepared by precipitating the complex precursors on the said carrier material, or by coating the carrier material with preformed complexes, advantage being taken in both instances when glass or silica carriers are used of the natural affinity which the said complexes have for adhering to silica surfaces.

The coated carrier material may then be heated to decompose the complex thereon to form silver metal containing cluster silver. Other decomposition products or residual components of the complex, e.g. tertiary bases when initially present, or acetic acid, may be removed if required by effecting the heat-treatment in vacuo.

Alternatively an impregnation technique may be used in which a porous particulate carrier material is impregnated with a solution of a silver salt, and the thus impregnated carrier exposed to the acid anhydride, e.g. acetic anhydride, with or without a tertiary base as hereinbefore described, at room or elevated temperatures to form the complex precursor in situ. The composition may then be thermally treated or washed with an aqueous medium, e.g. water or water vapour, or methanol, or an aqueous solution preferably at an elevated temperature to produce the silver metal containing cluster silver on or in the porous carrier. A modification of such a process comprises exposing the carrier material impregnated with silver compound to acid anhydride (e.g. acetic anhydride) in vaporous form at a temperature such that the complex is formed and is decomposed in situ in a single stage.

Silver metal containing cluster silver incorporated in or on such carriers may be associated with one or more activators and/or promotors conventionally used with silver catalysts.

Catalysts according to the invention may be derived from compounds of metals other than silver, together with silver compounds as hereinbefore described, to produce complex intermediates containing silver and one or more other metals.

The following example is provided of the air oxidation of ethylene according to the invention.

EXAMPLE 18

A catalyst composition was prepared as follows:
60 grm. of silver acetate was suspended in 500 grm. of acetic anhydride and the suspension refluxed for 2½ hours under argon in a glass vessel. Any acetic acid already present or formed during the reaction was removed continuously by distillation. The reaction mixture was then cooled, and the resulting yellow precipitate of the silver complex intermediate filtered off and washed with glacial acetic acid to remove residual acetic anhydride, and further washed with water, acetone and ether, until water present was removed, and residual solvents removed by vacuum (1 mm. at 30° C). The dried product was mildly explosive.

200 mgm. of the dried complex were shaken with 2 grm. of glass wool until the powdered complex adhered evenly over the glass fibre surfaces. The supported catalyst precursor composition was heated to a temperature of 180° C., and a stream of air was passed over the heated mass for 1 minute, whereby the complex turned black indicating the formation of metallic cluster silver according to the invention.

A mixture of ethylene and air in 1:7 volume proportion was passed through a silica tube at 180° C. at a flow rate of 12 litres/hour containing the said supported catalyst, the gaseous mixture being at atmospheric pressure. The effluent gases from the reaction tube contained ethylene oxide as the only detected organic oxidation product in a proportion corresponding to a 15% conversion of the ethylene feed. Of the ethylene converted at least 75% was converted to ethylene oxide.

The procedure of Example 18 was repeated, with the exception that the supported complex intermediate was decomposed by passing a stream of ethylene/air feed stock at 180° C., and after decomposition had been effected, the feedstock stream was continued to effect the oxidation reaction. Similar results were obtained.

A comparative oxidation run was made using as catalyst conventional silver supported on glass wool. Under conditions of the oxidation run, no ethylene oxide was detected in the effluent gases.

The following example is provided of the oxidation of propylene according to the invention.

EXAMPLE 19

A catalyst composition was prepared as follows:
A complex precursor was prepared as in Example 18 and 4 grms. of the dried complex were suspended in 40 mls. of water at 15° C. for 10 days in a glass vessel and the suspension was then heated to 90° C. and held at this temperature for 7 hours during which time the initial yellow material darkened and finally became black indicating the formation of silver metal containing cluster silver according to the invention.

The black product was filtered off to provide a dried product, 0.5 grm. of which was suspended on 2 grm. of glass wool, which was then heated in air to a temperature of 210° C. A stream of propylene and air in a 1:7 ratio by volume was passed through a silica tube at 180° C. at a flow rate of 12 litres/hour containing the supported catalyst, the gaseous mixture being at atmospheric pressure. The effluent gases from the reaction tube of the propylene contained organic oxidation products, 95% by volume of which consisted of propylene oxide. Of the propylene feed converted, 20% was converted to propylene oxide.

A comparative oxidation run was made using conventional silver supported on glass wool. Propylene oxide was not detected in the effluent gases.

The following example is provided for the oxidation of toluene.

EXAMPLE 20

A supported catalyst was prepared according to the procedure of Example 10, and air was bubbled through toluene at 15° C., and the resulting stream of air and entrained toluene vapour was passed through a silica tube containing the supported catalyst maintained at 180° C.

The effluent gases contained benzoic acid.

The following example is provided of the use of cluster silver complexes for the liquid phase oxidation of acetic acid.

EXAMPLE 21

0.5 grm. of the dried silver-containing complex of Example 10 was suspended in 10 mls. of a 30% by weight aqueous solution of acetic acid, and oxygen was bubbled through a glass vessel containing the suspension in the presence of light. The suspension remained bright yellow in colour and after 30 minutes at 15° C., the reaction liquid contained oxidation products as shown by the ability thereof to liberate free iodine from an aqueous solution of potassium iodide.

The following example is provided of the use of a cluster silver catalyst prepared by the preferred method of the invention in which the complex intermediate is prepared with the aid of a tertiary base.

EXAMPLE 22

15 grams of silver acetate were dissolved in 150 grams of pyridine, and the solution reacted with 150 grams of acetic anhydride at 20° C. under air. After 20 minutes the precipitate of silver ketenide/pyridine complex thus formed was filtered and washed with 5% aqueous acetic acid until free from pyridine, and then with water until free from acid, and dried by further washing with acetone and n-pentane.

0.2 grams of the dried product was distributed over 2 grams of glass wool, and heated for 10 minutes at 150° C., whereupon the yellow ketenide decomposed to form black silver metal containing cluster silver supported on the glass wool.

A mixture of air and propylene at 200° C. was oxidised over the supported catalyst to provide propylene oxide and acetone in a volume ratio of 1:3. 8% of the propylene was converted, and of the converted material 5% was propylene oxide and 15% was acetone.

What is claimed is:
1. Silver ketenide.
2. A method for preparing silver ketenide which comprises reacting a compound of conventional silver and an anhydride of a mono-carboxylic acid, the reactants being selected so that at least one of the reactants contains a

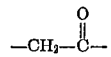

group, the reaction being effected in the presence of pyridine, whereby a yellowish or yellowish-red silver ketenide/pyridine complex is formed, separating the complex and treating the separated complex to remove the pyridine therefrom.

3. A method according to claim 2, in which the said silver compound is a compound selected from the group consisting of silver acetate, silver malonate, silver toluene p-sulphonate and silver oxide.

4. A method according to claim 2, in which the said organic anhydride is an organic anhydride selected from the group consisting of acetic anhydride and propionic anhydride.

5. A method for preparing silver ketenide, comprising suspending silver acetate in acetic anhydride, and adding pyridine drop-wise to the suspension whilst stirring whereby a yellow silver ketenide/pyridine complex is formed, separating the said complex and heating the separated complex with acetic anhydride to drive off the pyridine whereby silver ketenide is left behind.

6. An adduct of silver ketenide and a silver salt selected from the group consisting of silver nitrate and silver cyanide.

7. An adduct of silver ketenide and silver nitrate.

8. An adduct of silver ketenide and silver cyanide.

References Cited
UNITED STATES PATENTS

| | | | |
|---|---|---|---|
| 2,483,440 | 10/1949 | Shaw et al. | 260—430 |
| 2,474,869 | 7/1949 | Shaw et al. | 260—430 |
| 2,924,614 | 2/1960 | Reuter | 260—429.3 |

OTHER REFERENCES

Chemical Abstracts, vol. 56, 12920d (1962).

HELEN M. S. SNEED, Primary Examiner